United States Patent [19]

Comperatore

[11] 4,115,090
[45] Sep. 19, 1978

[54] SHAPING GLASS SHEETS BY GRAVITY SAGGING ON SOLID MOLDS

[75] Inventor: John A. Comperatore, Natrona Heights, Pa.

[73] Assignee: PPG Industries, Inc., Pittsburgh, Pa.

[21] Appl. No.: 819,783

[22] Filed: Jul. 28, 1977

[51] Int. Cl.² .................................................. C03B 23/02
[52] U.S. Cl. ........................................ 65/25 A; 65/107; 65/287
[58] Field of Search ................. 65/24, 25 R, 106, 107, 65/286, 287, 25 A

[56] References Cited

U.S. PATENT DOCUMENTS

| | | | |
|---|---|---|---|
| 2,377,849 | 6/1945 | Binkert et al. | 65/273 |
| 2,985,986 | 5/1961 | Leflet, Jr. | 65/107 X |
| 3,020,677 | 2/1962 | White | 65/107 |
| 3,074,258 | 1/1963 | Leflet | 65/159 |
| 3,216,811 | 11/1965 | Golightly | 65/107 |
| 3,607,186 | 9/1971 | Bognar | 65/107 |
| 3,681,043 | 9/1971 | Bognar | 65/107 X |
| 3,960,535 | 6/1976 | Hamilton et al. | 65/106 X |
| 3,992,181 | 11/1976 | Frank | 65/106 X |

*Primary Examiner*—Arthur D. Kellogg
*Attorney, Agent, or Firm*—Dennis G. Millman; Edward I. Mates

[57] ABSTRACT

A method and apparatus for shaping glass sheets by gravity sagging on essentially continuous-surfaced molds having gas vents. The molds are usable in a gas fired kiln wherein dirt and dust particles are likely to be lodged onto the upward facing shaping surface of the mold and impress marks on the heat-softened glass sheet as it is being shaped by gravity sagging. The gist of the present invention is to blow gas between the bottom surface of the glass and upward facing shaping surface of the continuous-surfaced mold as the glass sags toward the shaping surface so as to remove the dust and dirt particles as late as possible during the glass sheet shaping operation and still permit the applied gas to escape from between the shaping surface and the glass sheet bent into conformity therewith. The applied gas also hardens the lower glass surface.

8 Claims, 7 Drawing Figures

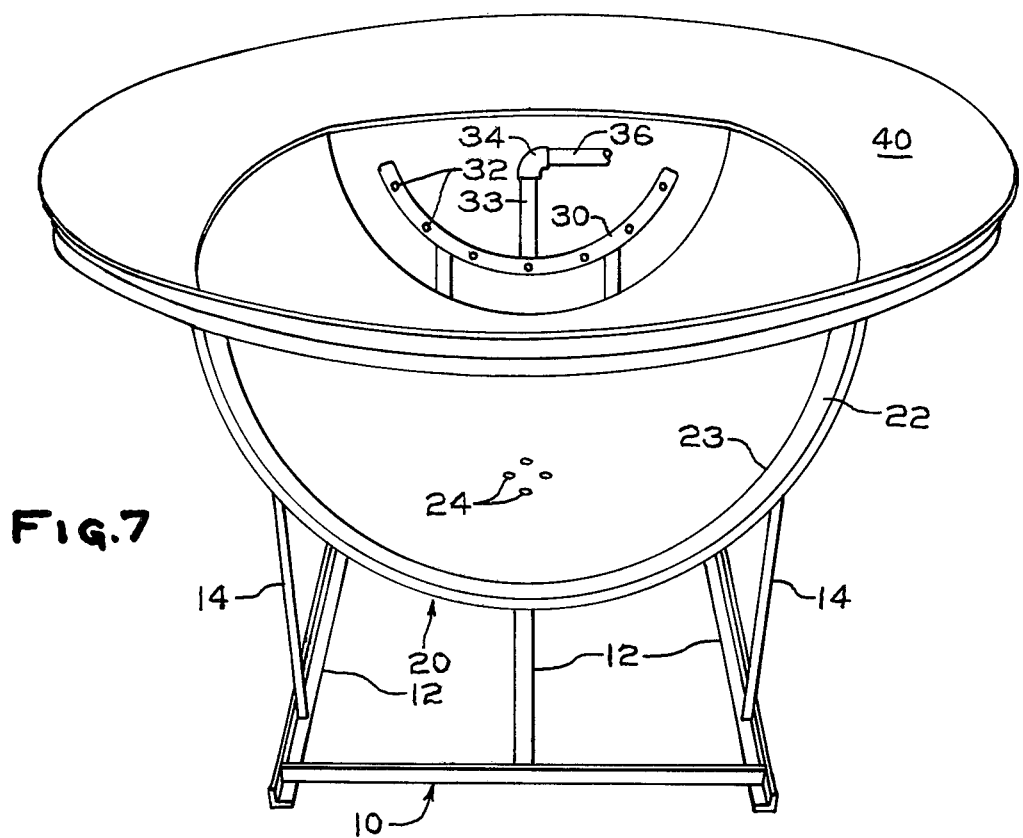
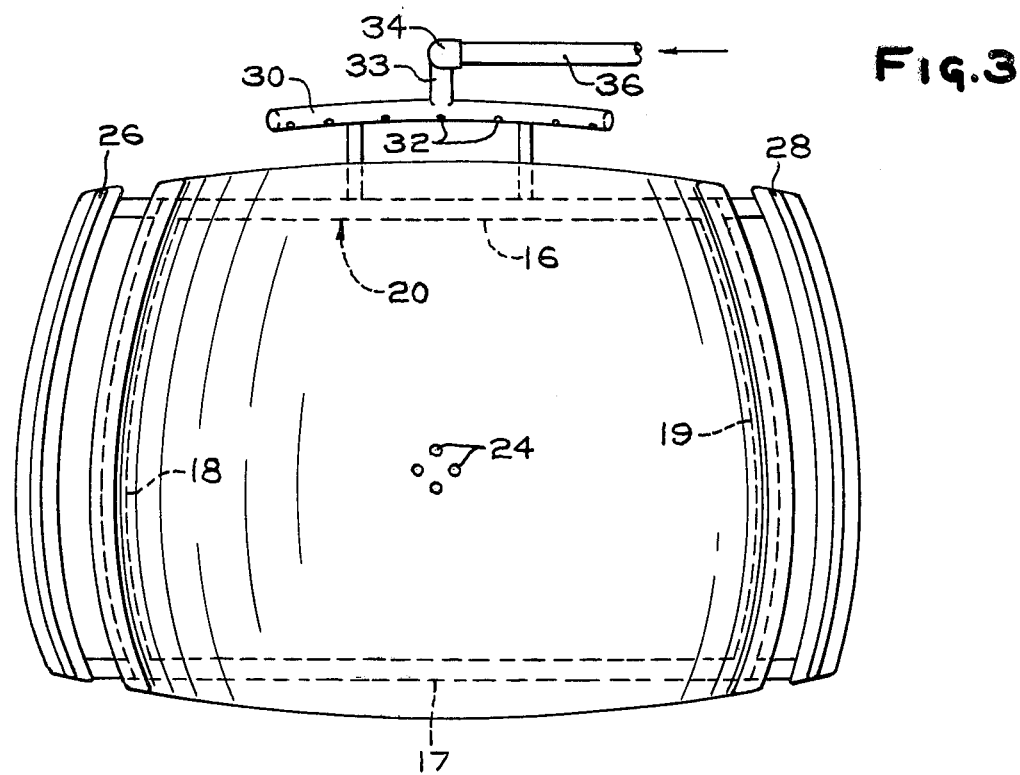

SHAPING GLASS SHEETS BY GRAVITY SAGGING ON SOLID MOLDS

BACKGROUND OF THE INVENTION

1. Field of the Invention

This invention relates to shaping glass sheets and has special utility for shaping glass sheets into certain cylindrical, conical and other complicated shapes that are used either as components of laminated aircraft transparencies or as molds for press polishing relatively rigid components of plastic composition of said complicated shapes that are incorporated in aircraft transparencies. A glass sheet shaped to a particular configuration produced according to the present invention either forms a press polishing mold for press polishing a transparent plastic component of a laminated transparency, or forms a component of glass to be laminated to other layers of glass and/or plastic material to form a laminated transparency.

The requirements for parts that are shaped for use as elements of aircraft transparencies or for making press polishing molds used to press polish components for laminated aircraft transparencies are not sufficient to warrant the use of high production equipment of the type used to shape windshields, back lights and curved side lights for automobiles. Therefore, parts destined for use in fabricating aircraft transparencies, either directly (as in components to be laminated) or indirectly (as in shaped molds to press polish components), are usually shaped during fabrication by gravity sagging in a kiln.

The shapes of typical aircraft components are such that it is practical to shape glass sheets in an environment having a substantially uniform temperature. It is more practical to heat a glass sheet supported in a kiln by heated gas products introduced into the kiln in spaced relation to the glass sheet supporting position mixed with the atmosphere of the kiln to produce a hot atmosphere of convective heat having more uniform heat than the radiantly heated atmosphere that results from using radiant heat sources such as electrical heaters or localized gas burners that directly face the glass sheet undergoing shaping.

Molds for shaping glass sheets have upward facing shaping surfaces conforming to the shape desired for the glass sheets to be shaped in the kiln. There are two types of bending molds used in kilns. One is the outline type, which supports the glass sheet about its marginal edge only. Such molds are preferred to make relatively uniformly shaped bends of relatively gentle curvature. However, when glass sheets are required to be shaped to non-uniform curvatures, the upward facing shaping surfaces of the molds are required to be at least essentially continuous, so as to provide support for the shaped glass sheet throughout substantially its entire extent so as to enable the glass to sag by gravity to conform throughout its extent more exactly to the shape of the upward facing shaping surface of the mold.

However, since the kilns develop a hot atmosphere by using heated gaseous combustion products, the gas currents in the kiln contain unoxidized carbon particles and also tend to remove refractory particles from the walls of the kiln and deposit some of these dirt and dust particles on the upward facing surface of the essentially continuous gravity sag bending molds. These deposited particles normally remain on the upward facing surface of the mold when the glass sags to conform to the upper mold shaping surface. The portions of the hot glass sheet come into contact with these particles to develop non-uniformities and form defects known in the art as "bulls eyes".

The presence of "bulls eyes" in a component of an aircraft transparency makes it unsuitable for use in laminating to other components to form a laminated transparency. Also, if the shaped glass sheet is used as a mold for press polishing a plastic component of an aircraft transparency, the "bulls eyes" in the glass cause corresponding surface defects in the plastic component press polished with the defective glass sheet. In either event, the optical defects in the laminated transparency that result from the conditions conducive to the formation of "bulls eyes" in the component of the laminated transparency either directly or indirectly causes a defective transparency that must be scrapped.

2. Description of the Prior Art

U.S. Pat. No. 2,377,849 to Binkert and Jendrisak discloses a gravity sagging bending mold having an air passage therethrough. Vacuum is applied by suction through the passage to enable a glass sheet to sag into close conformity with the upwardly facing shaping surface of the bending mold without forming air pockets between the lower surface of the glass and the upper surface of the mold that would tend to cause the glass sheet to deviate from its desired shape. While suction helps conform the shape of the glass sheet to that of the mold shaping surface, it is not capable of removing dust and dirt particles from the mold shaping surface.

U.S. Pat. No. 3,020,677 to White relates to shaping glass sheets by the gravity sag technique by sagging the sheet into supporting relation on an outline shaping surface of an outline type shaping mold. Since it is well known that it is difficult to control sag of a heat-softened glass sheet in its unsupported central area within the outline of the mold, this patent provides containers of water having apertured tops within the outline of the mold and below the mold shaping surface so that steam is applied through the apertured tops to the bottom surface of the glass sheet in certain localized areas where it is desired to control the amount of sag in the glass. This patent uses the flow of fluid to control shape and is not concerned with particle removal because particles are not supported in facing relation to the vision area of bent glass sheets when an outline type mold is used for shaping glass sheets.

U.S. Pat. No. 3,074,258 to Leflet relates to bending glass sheets mounted in pairs on an outline shaping mold. The glass sheets are conveyed through a bending lehr where the top sheet separates from the bottom sheet during the bending cycle. Blasts of gas are applied in the space between the upper and lower glass sheets to remove dust particles that may deposit between the glass sheets when they separate from one another and before the sheets come into closer, more intimate contact with one another at the end of the bending cycle. No provision is made in this patent to avoid local pockets of gas between the bent glass sheets that prevent complete intimate contact between the bent glass sheets throughout their entire extent.

U.S. Pat. No. 3,216,811 to Golightly discloses the technique of applying hot gaseous combustion products against selective portions of outline sag bending molds when the molds are returning along a conveyor path outside the lehr to a glass loading station at the entrance of the lehr. This technique produces selective heating of portions of the outline mold where the glass tends to be broken as a result of chill cracking because of the difference in temperature between the glass and the metal rail of the mold during the shaping operation. While the hot gases used to heat localized portions of the mold may deposit particles on the mold, such particles would not affect the optical properties of the bent glass sheets because outline molds support glass sheets in the marginal edge portions of the latter that surround the vision area.

U.S. Pat. Nos. 3,607,186 and 3,681,043 to Bognar disclose the application of vacuum to the lower portion of a gravity sag mold in combination with different treatments to the upper portion of the glass sheet supported on the upper portion of the mold. The combination of steps is alleged to improve the conformity of the shape of the glass sheet to that of the mold shaping surface. Neither of these patents are concerned with the problems of removing particles from the mold shaping surface.

U.S. Pat. No. 3,960,535 to Hamilton and Oelke discloses the application of gas from burners to locally condition glass sheets for tempering while at a shaping station. The areas of heat application are in the vicinity of openings through the thickness of the sheets.

U.S. Pat. No. 3,992,181 to Frank discloses the application of cooling fluid to the lower surface of a glass sheet undergoing shaping while moving through a roll forming station. The cooling fluid is so applied to reduce the tendency of the lower forming rolls, which engage hot moving glass sheets for a greater proportion of the time needed for a production cycle than the upper forming rolls, to become hotter than the upper forming rolls during a prolonged, continuous production run.

SUMMARY OF THE INVENTION

The present invention relates to a method of shaping a glass sheet by gravity sagging into a complicated shape defined by the upper surface of a mold having a substantially continuous shaping surface with gas venting means comprising heating the glass sheet to its softening point and while the glass is sagging toward the shaping surface and before it comes into full contact with the shaping surface applying hot gas under pressure along the upward facing shaping surface to remove contaminants from the shaping surface. Gas is applied to diminishing temperatures to harden the lower glass surface before the glass sheet sags to conform with said upward facing shaping surface. The apparatus aspect of this invention comprises a mold having a metal outline support supporting a solid, essentialy continuous, shaped ceramic member having an upward facing surface conforming to the shape desired for said glass sheet and venting means for relief of gas applied between the bottom surface of a glass sheet and the upper shaping surface of the mold defined by the upward facing surface of the shaped ceramic member. The mold further comprises means disposed to one side of the mold and provided with an apertured conduit shaped to conform to said upper shaping surface for applying hot gas under pressure along the upward facing surface of the mold at a time when the glass sheet is sagging toward said upward facing shaping surface.

The advantages of the present invention will be understood better in the light of a description of a specific embodiment and a variation thereof that follows.

BRIEF DESCRIPTION OF THE DRAWINGS

In the drawings that form part of the description of a specific embodiment of the present invention, and wherein like reference numbers refer to like structural elements.

FIG. 3 is a plan view of the mold of FIG. 1;

FIG. 7 is a schematic, perspective view similar to FIG. 4 of an alternate embodiment of a glass sheet shaping mold conforming to the invention suitable for shaping a glass sheet into a different complicated shape from that produced by the first embodiment.

DESCRIPTION OF A PREFERRED EMBODIMENT

Figure 1:
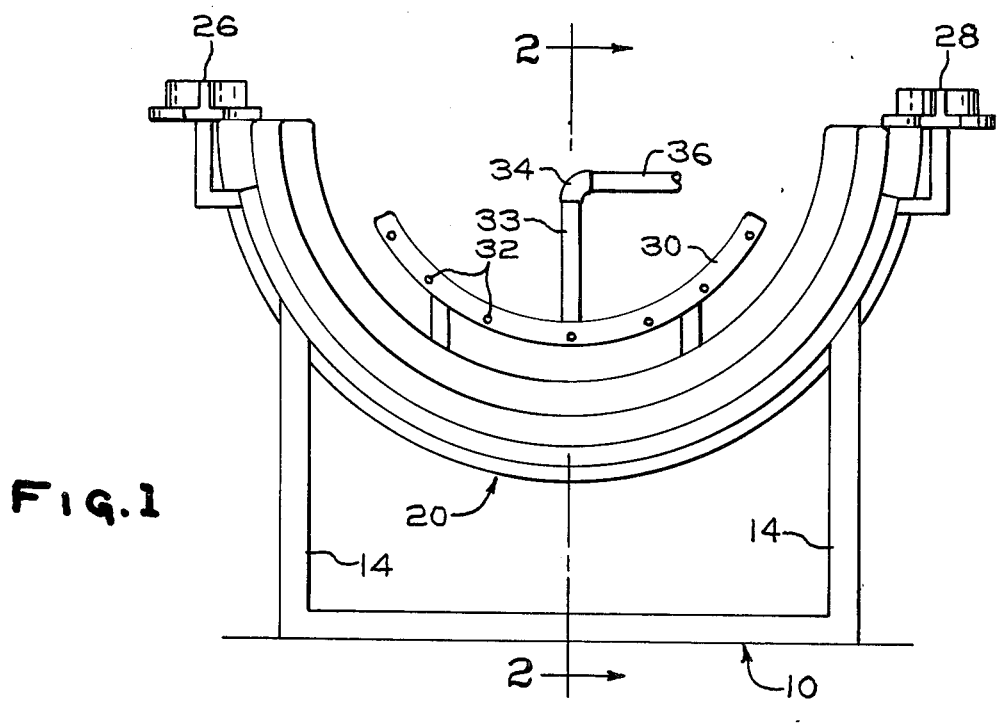
FIG. 1 is an end elevational view of a glass sheet shaping mold constructed according to a preferred embodiment of this invention.
Figure 2:
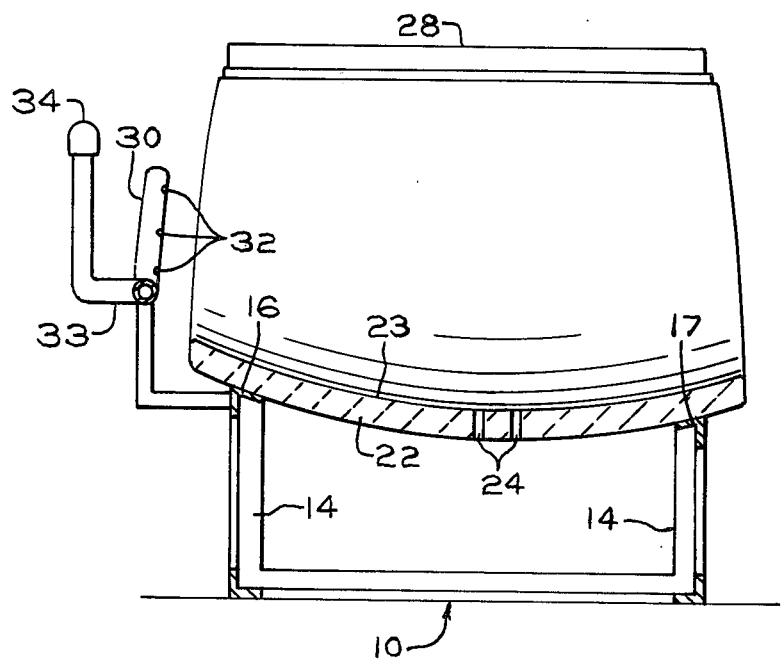
FIG. 2 is a transverse sectional view taken along the lines 2—2 of FIG. 1.

Referring to FIGS. 1 to 3 of the drawings, a preferred embodiment of the present invention comprises a carrying frame 10 including longitudinal and transverse base frame members 12 that are interconnected to one another and support several vertical uprights 14 which extend upward from the base frame members 12. The vertical uprights 14 are arranged around the carrying frame 10 in such a manner that some of the vertical uprights 14 support shaped end rails 16 and 17 and other uprights 14 support shaped side rails 18 and 19 that interconnect end rails 16 and 17. The shaped end rails 16 and 17 and the shaped side rails 18 and 19 combine to form a continuous cradle 20 that provides a support for a shaped sheet 22 of ceramic material slightly inboard of the marginal edge of the sheet 22.

The ceramic sheet 22 is preferably of a castable refractory cement. A suitable composition is a calcium aluminate containing approximately 95 percent of tabular alumina sold under the trademark PURETAB ® 3400 by Kaiser Refractories and has a typical weight analysis of the following ingredients:

| | | |
|---|---|---|
| $Al_2O_3$ | 93.65 | percent |
| $SiO_2$ | 0.03 | percent |
| CaO | 5.40 | percent |
| $Fe_2O_3$ | 0.27 | percent |
| MgO | 0.12 | percent |

The sheet is approximately one inch (25 millimeters) thick and extends about one inch (25 millimeters) beyond the outline of the cradle 20, and its upward facing surface 23 forms a shaping surface for the mold.

The upward facing surface 23 conforms in elevation to the shaped desired for a flat glass sheet G that is initially mounted on the mold for bending. The elevation of the shape of the ceramic sheet 22 is concave. At the lowermost portion of the ceramic sheet 22, a plurality of vent holes 24 extends through its thickness.

The carrying frame 10 also supports a pair of slide supports 26 and 28 disposed above and in flanking relation to the outermost side edge portions of the shaping surface 23 provided by the ceramic sheet 22. The slide supports are in the form of inverted T-rails which have upper surfaces extending slightly outward and approximately parallel to the outer side edges of the ceramic sheet 22 and substantially parallel to the side shaped rails 18 and 19, respectively, to provide support for a flat glass sheet over the mold shaping surface 23 preparatory to bending.

The carrying frame 10 also supports a bent apertured pipe 30. The latter is disposed outside one end of the mold provided by the upward facing shaping surface 23 of the ceramic sheet 22 and is shaped to have a shape conforming to the shape of the upward facing surface 23 in a direction parallel to, above, and to the outside of shaped end rail 17. The pipe is provided with apertures 32 along its length. The apertures of the pipe are approximately one inch (25 millimeters) above the shaping surface 23 and the pipe is located about one inch (25 millimeters) beyond the end of the mold. The apertured pipe 30 is connected to a feed pipe 33, and an elbow 34 to a gas supply line 36.

In a preferred embodiment of the present invention, a pipe of ⅜ inch (1 centimeter) diameter is provided with holes of one-sixteenth inch (1.6 millimeters) diameter spaced two inches (5 centimeters) apart along the length of the pipe.

By facing the apertures 32 toward the end of the shaping surface 23, gas jets combine to form a sheet of gas moving across the upward facing shaping surface 23 of the ceramic sheet 22 whenever gas under pressure is applied to the gas supply line 36 under pressure. As will be described subsequently, the gas is applied at a pressure sufficient to remove any dirt and dust particles and other contaminants that may be deposited on the upward facing shaping surface 23 of the ceramic sheet 22 at a particular portion of the bending cycle, so as to remove any particles from between the sagging glass sheet and the mold shaping surface at the last possible moment before the glass sheet sags into full conformity with the upward facing shaping surface 23 of the ceramic sheet mold 22. The presence of the vent holes 24 permits the escape or venting of gas from between the glass sheet undergoing shaping and the upward facing shaping surface so as to permit the glass sheet to conform exactly to the upper shaping surface 23 without providing pockets of gas therebetween, which pockets would cause deviations from desired curvature in the shaped glass.

Figure 4:
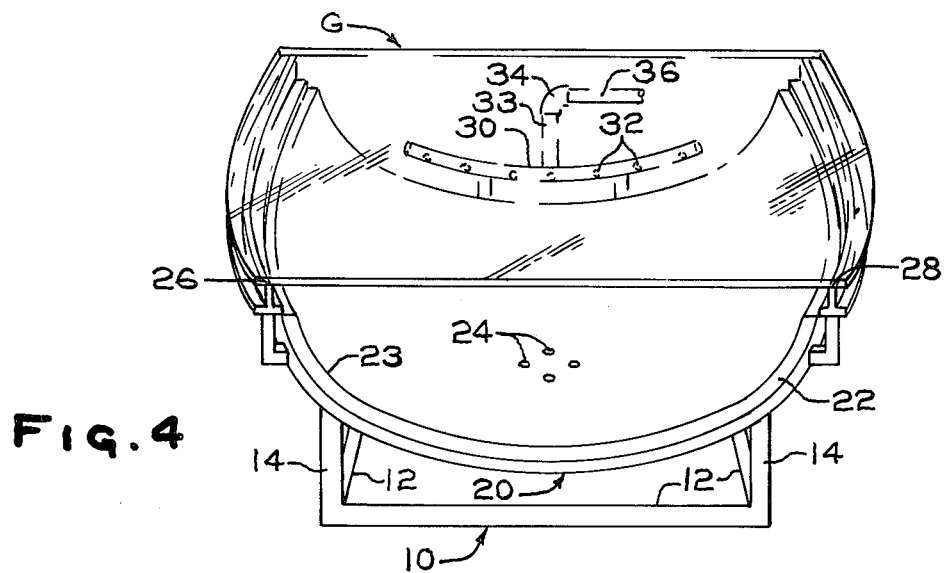
FIG. 4 is a schematic, perspective view of the mold of FIG. 1, showing a flat glass sheet mounted in bending relation thereover preparatory to a shaping operation.
Figure 5:
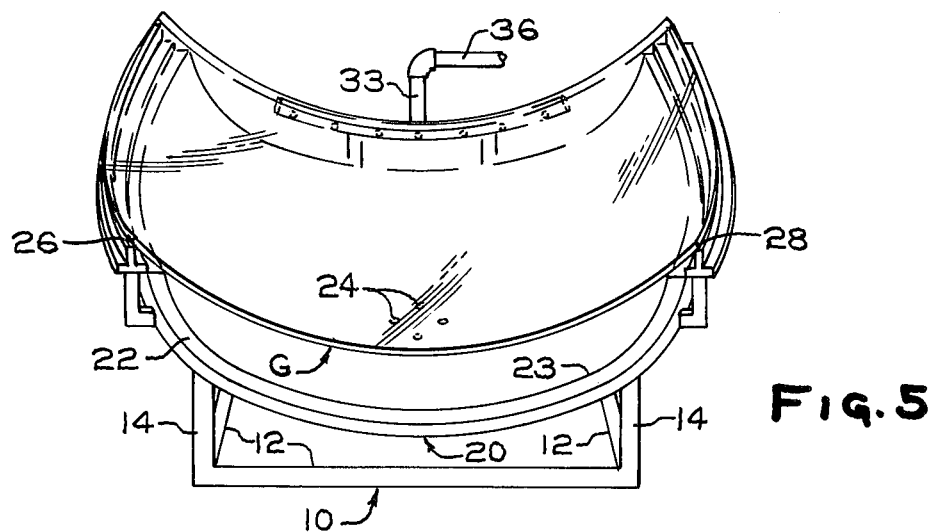
FIG. 5 is a schematic, perspective view similar to FIG. 4, showing the glass sheet after it has sagged a major portion of the way toward the upward facing shaping surface of the mold and gas is supplied between the glass sheet and the shaping surface to remove particles from the latter.
Figure 6:
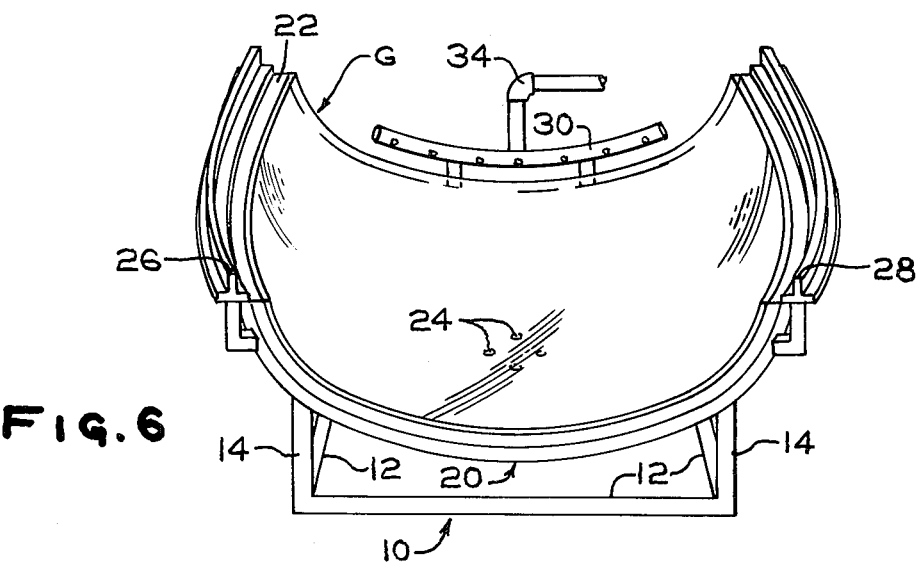
FIG. 6 is a schematic, perspective view similar to FIGS. 4 and 5, showing how the mold supports the glass sheet after the latter has sagged completely into conformity with the shaping surface of said mold.

Referring to FIGS. 4, 5 and 6, a typical bending operation performed in conjunction with the apparatus depicted in the embodiment of FIGS. 1 to 3 of the present invention will now be described. Initially, a glass sheet G while flat, is supported in bending relation over the shaping surface 23 of the ceramic sheet 22 and is supported along its opposite longitudinal edges along the slide supports 26 and 28. In this embodiment, their inverted-T-cross-section construction provides minimum resistance to the sliding of the lower surface of the glass sheet relative thereto as the glass sheet is heated and its unsupported central portion sags toward the upward facing shaping surface 23 of the ceramic sheet 22. This stage of the bending cycle is depicted in FIG. 4.

As the glass sheet sags in response to its heating within the kiln and in response to the force of gravity acting on the softening glass sheet due to the application of heat within the kiln, the unsupported central portion of the glass sheet continues to sag toward the shaping surface 23 as its rigidity decreases due to its continued heating. The opposite side edges of the glass sheet continues to slide over the slide supports 26 and 28 as the sheet sags toward and shape defined by the upward facing shaping surface 23 of the ceramic sheet mold 22. When the glass sheet approaches the shaping surface 23 in the latter stages of bending, in order to remove dust and dirt particles and other contaminants that may have been deposited on the upward facing shaping surface 23, gas under a slight pressure is applied to the shaped apertured pipe 30 and released through the apertures 32. The resulting jets of pressurized gas combine to form a stream that flows over the shaping surface 23, and sweeps any particles from the shaping surface, while permitting the glass sheet G to continue to sag to the shaping surface 23. FIG. 5 shows the stage of bending at which gas is preferably applied.

For practical purposes in a production operation, the gas used to remove particles from the shaping surface 23 may be pressurized air from a factory air line applied through the apertures 32 at a slight pressure of less than one pound per square inch (7 Kilopascals), which is sufficient to remove any undesired particles. It is unnecessary to heat the air supplied through the apertures because sufficient air is stored within the kiln in the feed pipe 33 and the supply line 36 during the time the mold is within the kiln and the glass sheet is being heated to a temperature at which it sags to enable the air temperature to rise to one that approximates that of the environment in the kiln before it becomes advisable to apply the air blasts through the apertures 32. The air may be applied either continuously or intermittently.

The glass continues to sag into the position depicted in FIG. 6 wherein the glass conforms exactly to the shape of the upward facing ceramic sheet mold 22. Before the glass sheet G sags into complete conformance with the shaping surface 23, a valve controlling air flow through the pipe 30 and its apertures 32 is closed.

Any gas between the lower surface of the glass sheet G and the shaping surface 23 is vented through the vent holes 24 as the unsupported central portion of the glass sheet nears the shaping surface. This venting permits the glass sheet to conform exactly with the shaping surface 23 that faces upward from the ceramic sheet mold 22.

It is understood that various other embodiments may be provided for making different shapes. For example, FIG. 7 shows an embodiment for shaping glass sheets into a barrel shape configuration. Instead of slide supports of T-rail configuration extending along the side edges of the mold, in the FIG. 7 embodiment, a slide 40 extends around the entire perimeter of the mold. The pipe 30 is provided with a configuration and relative position relative to the shaping surface at the adjacent end of the mold similar to the configuration depicted in the embodiment of FIGS. 1 to 6. The principle of operation of the FIG. 7 embodiment is based on that described for the first embodiment. However, the shape of the cradle 20 and of the ceramic sheet 22 provided with vent holes 24 is different in the FIG. 7 embodiment from the corresponding elements of the first embodiment in order to produce glass sheets of a different shape.

There is no fixed rule that can be stated for the time and temperature cycle that produces an optimum bending cycle in a bending kiln. Such factors as the composition of the glass sheet to be bent, its thickness and the severity of curvature desired determine the time-temperature relation of the bending cycle. Typical temperatures for shaping float glass sheets of commercial soda-lime-silica composition range from about 1050° F. to 1300° F. (565° C. to 705° C.). The art of gravity sag bending is well known and so are the parameters of the bending cycle. The contribution of the present invention is to insure that glass sheets shaped by gravity sag bending on substantially continuous shaping surfaces conform as exactly as possible to the mold shaping surface and do not develop "bulls-eyes" during the shaping operation.

In performing the best mode of this invention, the air or gas is applied to sweep across the shaping surface 23 for a period of more than 15 seconds and not exceeding two minutes. A duration of 30 to 45 seconds is preferred. When air is supplied from a factory air supply system, initially the air blasts supplied come from the air stored in the feed pipe 33 and the portion of the gas supply pipe 36 that is within the hot kiln. Consequently, the air is initially supplied at a temperature approximating that of the kiln atmosphere. As the application of air continues, colder air from the air supply system enters the supply pipe 36 and feed pipe 33. The additional air becomes heated somewhat, but does not heat up to the elevated kiln temperature, as it passes through the supply pipe 36 and the feed pipe 33 en route to the apertured pipe 30. Consequently, the air blasts from apertures 32 sweep across the shaping surface 23 and across the bottom surface of the sagging glass sheet at an initial temperature that approximates the kiln temperature followed by additional air at successively lower temperatures. The cooler air supplied during the latter stages of air application hardens the skin of the sagging glass sheet at its bottom surface portion before it contacts the upward facing shaping surface 23. The application of air is discontinued in a timely manner so as not to affect significantly the temperature throughout the rest of the thickness of the glass sheet. Thus, the glass sheet maintains a smooth, relatively hard, bottom surface that engages the upward facing shaping surface 23 to conform to the exact shape of the latter.

If the bottom surface of the glass is not hardened in the manner described, it would tend to duplicate any departures from smoothness that may exist in the form of pores in the shaping surface 23 of the ceramic sheet mold 22. Any surface irregularities resulting from heat-softened glass sagging into engagement with a mold shaping surface provided with pores that duplicate such pores are termed "orange peel" in the art. Continuous application of air blasts for approximately 30 seconds at a pressure of 1 pound per square inch (approximately 7 Kilopascals) reduces the severity of "orange peel" considerably.

The form of the invention shown and described in this specification represents an illustrative preferred embodiment and certain modifications thereof. It is understood that the particular dimensions recited are by way of example only and that various changes may be made without departing from the gist of the invention as defined in the claimed subject matter which follows.

What is claimed is:

1. In the method of bending a glass sheet by gravity sagging in a gas fired kiln comprising supporting said glass sheet in bending relation above a substantialy continuous upwardly facing shaping surface of a bending mold having a permanent shape conforming to that desired for the sheet after shaping, inserting said mold supporting said sheet within said gas fired kiln, heating said sheet within said kiln to an elevated temperature sufficient to soften said glass sheet whereby said glass sheet sags a predetermined sag distance toward said upward facing shaping surface until it conforms to said permanent shape and wherein the presence of particles on said shaping surface when said heat-softened sheet comes into contact with said shaping surface causes optical defects in the shaped glass sheet, the improvement comprising applying gas under pressure to said upwardly facing shaping surface at a force sufficient to remove said particles from said shaping surface after said glass sheet has started to sag toward said shaping surface and while said glass sheet is spaced less than half of said sag distance from said shaping surface, said gas being initially applied at a temperature approximating the temperature within the kiln and subsequently at a lower temperature for sufficient time to harden the skin of the sagging glass sheet at its bottom surface without significantly affecting the temperature throughout the rest of the thickness of the glass sheet, and removing said applied gas from between said sagging glass sheet and said shaping surface while said glass sheet sags into conformity with said shaping surface.

2. The improvement as in claim 1, wherein said hot gas is applied at a pressure of less than 1 pound per square inch (7 Kilopascals).

3. The improvement as in claim 1, wherein said glass sheet is initially supported in bending relation to a shaping surface of concave elevation and said gas is applied under pressure after the glass sheet portion which must sag a maximum distance to reach said shaping surface has sagged a majority of but less than all of said sag distance toward said shaping surface.

4. The improvement as in claim 1, wherein said gas is applied continuously under pressure.

5. The improvement as in claim 1, wherein said gas is applied intermittently.

6. The improvement as in claim 1, wherein said gas that is applied is air.

7. The improvement as in claim 1, wherein said hot gas is applied for a period of between 15 seconds and 2 minutes.

8. The improvement as in claim 7, wherein said hot gas is applied for a period of between 30 seconds and 45 seconds.

* * * * *